United States Patent [19]

Laufer

[11] 4,068,024

[45] Jan. 10, 1978

[54] PROCESS FOR PREPARING FINELY DIVIDED HYDROPHOBIC OXIDE PARTICLES

[75] Inventor: Siegmar Laufer, Rheinfelden (Baden), Germany

[73] Assignee: Deutsche Gold- und Silber-Scheideanstalt Vormals Roessler, Frankfurt, Germany

[21] Appl. No.: 496,676

[22] Filed: Aug. 12, 1974

Related U.S. Application Data

[63] Continuation of Ser. No. 201,320, Nov. 23, 1971, abandoned.

[30] Foreign Application Priority Data

Nov. 24, 1970 Germany ................. 2057750

[51] Int. Cl.² ............... B23K 31/02; B23K 35/38
[52] U.S. Cl. .................. 427/220; 106/288 B; 106/308 Q
[58] Field of Search ............ 117/54, 100 B, 100 S, 117/109, 121, 123 A; 106/288 B, 308 Q; 427/314, 215, 242, 220, 221

[56] References Cited

U.S. PATENT DOCUMENTS

| 2,027,931 | 1/1936 | Ray ................. 117/169 A |
|---|---|---|
| 2,657,149 | 10/1953 | Sler ................. 106/308 Q |
| 2,721,855 | 10/1955 | Kin ................. 117/123 A |
| 2,768,909 | 10/1956 | Haslam ................. 117/121 |
| 2,881,566 | 4/1959 | Badger ................. 117/54 |
| 3,085,905 | 4/1963 | Prevot et al. ................. 117/106 R |
| 3,556,830 | 1/1971 | Charrin et al. ................. 117/100 S |
| 3,617,333 | 11/1971 | Brown ................. 117/124 T |
| 3,649,588 | 3/1972 | Kennedy-Skipton ................. 106/308 Q |
| 3,713,886 | 1/1973 | Fulton et al. ................. 117/100 B |
| 3,920,865 | 11/1975 | Laufer et al. ................. 427/220 |

FOREIGN PATENT DOCUMENTS

| 672,716 | 1952 | United Kingdom ................. 117/121 |
|---|---|---|
| 1,032,187 | 1953 | France ................. 117/169 A |

*Primary Examiner*—Ronald H. Smith
*Assistant Examiner*—S. Silverberg
*Attorney, Agent, or Firm*—Beveridge, DeGrandi, Kline et al

[57] ABSTRACT

A process for preparing hydrophobic finely divided particles of oxides of metals and/or oxides of silicon by chemically bonding hydrocarbon radicals to the surface of the oxide particles, said process comprising intensively mixing oxide particles having a water content less than about 1% by weight with a hydrolyzable metal or metalloid compound containing OR groups, wherein said compound is an ester of the general formula:

$$Me(OR)_4$$

wherein Me is an element from group IV of the periodic table, and each R is independently selected from $C_1$–$C_8$ alkyl radicals or an aryl radical. A hydrophobic silicon dioxide particle is provided. Particles prepared by the process are useful as fillers in elastomers.

14 Claims, No Drawings

PROCESS FOR PREPARING FINELY DIVIDED HYDROPHOBIC OXIDE PARTICLES

CROSS-REFERENCES TO RELATED APPLICATIONS

This is a continuation of application Ser. No. 201,320, filed Nov. 23, 1971, now abandoned, which is relied upon and the entire disclosure and specification of which is hereby incorporated by reference.

BACKGROUND OF THE INVENTION

This invention relates to a process for preparing hydrophobic finely divided particles of oxides of metals and oxides of silicon by chemically bonding hydrocarbon radicals to the surface of the oxide particles. More particularly, the oxides are treated with hydrolysable metal or metalloid compounds containing OR groups.

It is known in the art that particles can be rendered hydrophobic by treatment with organo-silanes to form metals or metalloids on the surface of the particles. Such products are particularly useful when the hydrocarbon radicals (preferably methyl) are chemically bonded to the surface of finely distributed oxides, which renders the oxides, depending upon the quantity of hydrocarbon radicals present, either partially or completely hydrophobic.

It is characteristic of this type of treated particle that the transition from entirely hydrophilic to entirely hydrophobic behavior first occurs with a certain "degree of hydrophobing", more or less immediately without any distinct intermediate phase. Thus for example, products of this type with only 0.3% C or less possess hydrophilic characteristics and behave like the untreated materials. On the other hand, products with at least about 0.5 – 0.7% C are practically entirely hydrophobic depending on the specific surface characteristics of the starting oxides. It would be desirable to be able to prepare products having a degree of hydrophobing lying between these extremes, which behave like mixtures of hydrophobic and hydrophilic oxides. However, experience has shown that it is not possible to obtain products which are hydrophobic and cannot be wetted with water, but which nevertheless retain certain hydrophilic characteristics. For certain purposes, for example, reinforcing agents for silicon rubber and other elastomers, it is desirable to have fillers which are hydrophobic and distinctly organophilic, but which also have an affinity for protons. The previously mentioned hydrophobic products do not possess this latter characteristic since the alkyl or aryl radicals, bonded to silicon atoms, possess no affinity for protons. Also, small residues of, for example, silanol groups, on the oxide particles (such as occur in a truly hydrophobic product) are screened by large numbers of alkyl groups in such a way that the particle does not exhibit proton affinity. This latter effect has actually become a quality characteristic of such products.

Clearly, entirely hydrophobic oxides are not wetted by water. However, finely divided hydrophobic silicon dioxide particles can demonstrate proton affinity by treating the particles in such a way that only part of the silanol groups located on the surface are converted to silicon alkyl groups, while the remainder of the silanol groups are converted to, for example, silicon alkoxy groups. Unlike the silicon alkyl group, the silicon alkoxy group exhibits proton affinity to a certain degree.

It is known in the art that such products can be produced by treating silicon dioxide with organoalkoxy silanes. The quantity ratio of silicon alkyl groups to silicon alkoxy groups located on the surface of the particles is equal to or greater than 1.

Particles, such as fillers, which are to be lipophilic, but which on the other hand are to possess a high degree of proton affinity with simultaneous nonwettability by water, must have as many silicon alkoxy groups as possible, and as few silanol groups as possible. Preferably the particles contain no silanol groups at all. The number of silocon alkyl groups is only of secondary importance, and in some cases of no importance at all. There presently exists a gap in the state of the art by which such products can be obtained.

It is known in the art that silicic acid aerogels can be given organophilic characteristics by coating them with a surface film of a polymeric organic silicate. (See DAS No. 1,048,889). These products are defined in part by the degree of polymerization of the surface film. If the degree of polymerization of the surface film lies above 25, the product can be hydrophilic, partially hydrophobic, but not organophilic or hydrophobic and organophilic. Since one is not dealing with uniformly hydrophobic material, but rather with hydrophilic particles wrapped in an organic more or less water repellant, layer wettable by water, considerable quantities of organic "wrapping material" are needed. For example, in order to obtain only partially hydrophobic products, about 20% by weight tetraethyl-alcosilicate is required. It will be apparant that in order to achieve completely hydrophobic products, disproportionately larger quantities of "wrapping material" are needed. For this reason, the production of entirely hydrophobic products by this method is impractical. (See the above DAS)

BRIEF SUMMARY OF THE INVENTION

According to this invention there is provided a process for preparing hydrophobic finely divided particles of oxides of metals and/or oxides of silicon by chemically bonding hydrocarbon radicals to the surface of the oxide particles. The process comprises intensively mixing oxide particles having a water content less than about 1% by weight with a hydrolysable metal or metalloid compound containing OR groups. The compound is an ester of the general formula:

wherein Me is an element from group IV of the periodic table, and each R is independently selected from $C_1$-$C_8$ alkyl radicals or an aryl radical or an alkyl-aryl radical.

This invention also provides a finely divided hydrophobic and lipophilic silicon dioxide particle practically free of silanol groups on its surface, said particle having chemically bonded thereto alkoxy or aryloxy groups sufficient to render said particle practically incapable of being wetted with water at standard temperature, said particle having proton affinity sufficient to result in said particle being wetted after extended contact with boiling water.

DETAILED DESCRIPTION

This invention provides a process for preparing hydrophobic finely divided oxides of metals and/or oxides of silicon by anchoring hydrocarbon radicals on the surface of the oxide by treatment of the oxides with metal or metalloid compounds which are hydrolyzable and which contain OR groups. By means of this invention it is possible to produce lipophilic fillers entirely notwettable by water, but which nevertheless possess a high degree of proton affinity. The process of this invention is carried out in a very simple manner by a truly topochemical reaction on the active surfaces of the starting substances.

The ester compound used in the process of this invention has the general formula:

Me is an element of the IVth group of the periodic table. Titanium and silicon are preferred. R is an alkyl radical having 1-8 carbon atoms, or an aryl radical, such as phenyl or naphthyl. The radicals R in the ester can be independently selected from the alkyl and aryl radicals. For example, three of the R's in the ester can be alkyl radicals and the fourth R an aryl radical. Further, each of the three or four R's can be different alkyl radicals.

According to the process of this invention, the ester is intensively mixed with the oxides to be treated. The oxide particles should have a water content of less than about 1% by weight. Preferably, the water content is about 0–0.2% by weight. A particularly preferred ester is a tetraethyl-alcosilicate or an oligomer thereof.

In a preferred embodiment of this invention, the ester and oxides are mixed at a pressure of about 1,000 Torr to about $10^{-2}$ Torr, and at a temperature of about 20° – 300° C. Mixing is preferably conducted for a few minutes to about 24 hours. A preferred temperature is about 20° – 200° C, while 20° – 35° C is particularly preferred.

In another preferred embodiment of this invention, the oxide particles are activated prior to mixing with the ester. Activation is accomplished by heating the oxide particles at about 700° – 1,000° C for less than about 60 seconds in a stream of inert gas. An inert gas is one which does not react with the oxide particles. Activaton of the particles in this manner reduces the time required to obtain hydrophobic products.

In the case of silicic acids or their mixtures with other metal oxides, such as $Al_2O_3$ or $TiO_2$, having a water content of more than about 1% by weight, the treated products exhibit no hydrophobic characteristics. If large quantities of the ester compound are used, the final products exhibit insufficient hydrophobic properties. Certain oxides take on water during storage or during production processes. The water can be practically removed by the activation step previously described. See also German Patent Application No. P 17 67 226.3 and P 20 04 443.3.

Ester compounds falling within the previously mentioned generic formula can be used. It is preferred that the ester compound be either gaseous or volatile at the mixing temperature in order to be evenly distributed upon contact with the oxide particles. However, less volatile ester compounds can also be used, such as those in liquid form. The liquid can be sprayed on the oxide particles by means well known in the art. It will of course be understood that mixtures of the various ester compounds can be used.

In a preferred embodiment of this invention, ester compounds are selected, which when mixed with oxide particles, produce a product entirely unwettable by water at ambient temperature within 30 minutes – 3 hours. Alkoxy and aroxy silanes and the similar compounds of titanium have proven to be particularly suitable. It will also be understood that mixtures of oxides can be treated with any of the esters.

It is preferred that activation be carried out in a fluidized bed.

The process of this invention can be carried out in almost any desired manner. A continuous method of production is preferred. For example, activated silicic acid can be contacted with one or more ester compounds in a fluidized bed.

In another preferred embodiment of this invention, the oxide particles are contacted with anhydrous ammonia gas prior to mixing, during mixing or after mixing of the oxides and ester. When the oxides and esters are contacted in a fluidized bed, and if alcohol which develops during the reaction and ammonia are to be removed, which is generally the case, then the reaction mixture can subsequently be passed through a shorter or longer tarrying zone. The reaction mixture can subsequently be passed through a countercurrent fluidized bed in which the removal of ammonia and alcohol is carried out by means of a stream of inert gas.

The process of this invention will be more clearly understood by reference to the following examples:

EXAMPLE 1 a. 500 g of a pyrogenic silicic acid (surface area 120 $m^2/g$ BET) are placed in a vessel after activation, and put under a vacuum. 50 g (of 10% by weight) tetra-n-butoxy silane are dripped in at room temperature within a few minutes, while it is briskly agitated. After the vacuum is neutralized with $N_2$, a dry $NH_3$ stream of gas is introduced into the product for 2 – 3 seconds. A sample taken 30 minutes after conducting ammonia through it remains completely unwettable even after intensive shaking with water; the aqueous phase is completely clear.

b. The experiment described in Example 1(a) is carried out in the same manner, but without the treatment with $NH_3$.

A sample taken after 3 hours is largely hydrophobic; after intensive shaking with water the aqueous phase is slightly turbid.

A hydrophobic silicic acid produced according to Example 1(a) is left standing in water for 96 hours at ambient temperature. It is shaken twice daily and intensively each time for 5 minutes. At the end of the experiment, the aqueous phase is still completely clear.

The capability for reaction of the same completely hydrophobic product at ambient temperature is evident by boiling with water because of its simultaneously existing proton affinity. For example, after 30 minutes in hot water of 100° C, 20% of the originally hydrophobic silicic acid of Example 1(a) passes over into the aqueous phase.

EXAMPLE 2

500 g of a mixed oxide (silicic acid with 1% $Al_2O_3$), surface area 80 $m^2/g$ BET, with a spectroscopically measured water content of less than 0.1%, is put into a vessel, placed under a vacuum, and sprayed for 3 minutes with 50 g (of 10% by weight) tetrakis-ethylhexoxy silane, while briskly agitated. After the vacuum is neutralized with $N_2$, a dry stream of $NH_3$ gas is introduced in the mixture for 3 seconds. Subsequently, the product is heated in a rotary flask for 1 hour at a temperature of 100° C.

Afterwards the product is completely hydrophobic. A sample is left for 96 hours in water standing at ambient temperature. It was shaken intensively twice daily, each time for 5 minutes. The aqueous phase remains completely clear for the entire time.

EXAMPLE 3

500 g of a precipitated silicic acid (surface area 150 m²/g BET) are sprayed after activation with 50 g (of 10% by weight) tetra-ethoxy silane at ambient temperature and while being stirred intensively.

After 5 minutes a dry stream of $NH_3$ gas is conducted through the mixture for 2 – 3 seconds while stirring.

15 minutes after feeding in the ammonia, the product is no longer wetted by water.

EXAMPLE 4

500 g of a pyrogenic silicic acid (surface area 120 m²/g BET) are placed in a vessel after activation, put under vacuum, and 75 g (of 15% by weight) butyl titanate (monomer), heated previously to about 70° C, are dripped in within a few minutes at ambient temperature while being agitated briskly.

After 30 minutes the vacuum is neutralized with $N_2$, and a dry stream of $NH_3$ gas is conducted through the mixture for 2 to 3 seconds.

A sample is taken after 8 hours; even after intensive shaking with water it remained entirely unwettable; the aqueous phase is still completely clear after standing for 8 days.

I claim:

1. A process for preparing hydrophobic finely divided oxide particles consisting essentially of pyrogenic or precipitated silicic acid particles by chemically bonding hydrocarbon radicals to the surface of said particles, said process comprising rendering said particles hydrophobic by intensively mixing said particles with a hydrolysable metal or metalloid compound containing OR groups, wherein said compound is an ester of the formula:

$$Me(OR)_4$$

wherein Me is an element from group IV of the Periodic Table, and each R is independently selected from $C_1$–$C_8$ alkyl radicals, an aryl radical or an alkaryl radical; wherein prior to mixing, during mixing, or after mixing of the oxides and ester, said particles are contacted with anhydrous $NH_3$ gas; and further wherein said particles have a water content less than about 1% by weight.

2. Process according to claim 1 in which said silicic acid particles are in admixture with $Al_2O_3$ or $TiO_2$.

3. Process of claim 1 in which Me is titanium or silicon.

4. Process of claim 1 in which mixing is conducted at a pressure of about 1000 Torr to about $10^{-2}$ Torr, and at about 20°–300° C for a few minutes to about 24 hours.

5. Process of claim 4 in which the oxides have a water content of about 0–0.2% by weight.

6. Process of claim 5 in which mixtures of oxides are treated with the ester.

7. Process of claim 4 in which the oxide particles are activated prior to mixing with the ester, said activation comprising heating the oxide particles at about 700°–1000° C for less than about 60 seconds in a stream of inert gas.

8. Process of claim 7 in which activation is carried out in a fluidized bed.

9. Process of claim 8 in which the ester is a tetraalkoxysilane or an oligomer thereof.

10. Process of claim 4 in which the mixing is conducted at about 20°–200° C.

11. Process of claim 4 in which mixing is conducted at about 20°–35° C.

12. Process of claim 9 in which the ester is tetrakisethylhexoxy-silane.

13. Process according to claim 1 in which said hydrolyzable metal or metalloid compound is in a gaseous phase.

14. A process for preparing hydrophobic finely divided oxide particles consisting essentially of pyrogenic or precipitated silicic acid particles by chemically bonding hydrocarbon radicals to the surface of said particles, said process consisting of rendering said particles hydrophobic by intensively mixing said particles at a pressure of about 1000 Torr to about $10^{-2}$ Torr, and at about 20° to about 300° C for a few minutes to about 24 hours with a hydrolysable metal or metalloid compound containing OR groups, wherein said compound is an ester of the formula:

$$ME(OR)_4$$

wherein Me is titanium or silicon, and each R is independently selected from $C_1$–$C_8$ alkyl radicals, an aryl radical or an alkaryl radical, wherein prior to mixing, during mixing, or after mixing of the oxides and ester, said particles are contacted with anhydrous $NH_3$ gas; and further wherein said particles have a water content less than about 1% by weight.

* * * * *